(12) United States Patent
Neubauer

(10) Patent No.: US 12,128,851 B2
(45) Date of Patent: Oct. 29, 2024

(54) MOTOR VEHICLE HAVING AT LEAST ONE DRIVER'S SEAT

(71) Applicant: HSM GmbH & Co. KG, Ernsgaden (DE)

(72) Inventor: Kai Neubauer, Neustadt an der Donau (DE)

(73) Assignee: HSM GMBH & CO. KG, Ernsgaden (DE)

( * ) Notice: Subject to any disclaimer, the term of this patent is extended or adjusted under 35 U.S.C. 154(b) by 127 days.

(21) Appl. No.: 17/822,166

(22) Filed: Aug. 25, 2022

(65) Prior Publication Data
US 2023/0069796 A1     Mar. 2, 2023

(30) Foreign Application Priority Data
Aug. 26, 2021   (DE) .................... 20 2021 002 772.6

(51) Int. Cl.
| | |
|---|---|
| *B60N 2/40* | (2006.01) |
| *B60N 2/42* | (2006.01) |
| *B60R 22/03* | (2006.01) |
| *B60R 22/12* | (2006.01) |
| *B60R 22/48* | (2006.01) |

(52) U.S. Cl.
CPC ................ *B60R 22/03* (2013.01); *B60N 2/42* (2013.01); *B60R 22/12* (2013.01); *B60R 22/48* (2013.01); *B60R 2022/4816* (2013.01); *B60R 2022/4866* (2013.01)

(58) Field of Classification Search
CPC ......... B60R 22/03; B60R 22/04; B60R 22/06; B60R 22/08; B60R 22/195; B60R 22/32; B60R 22/36; B60R 22/46; B60R 22/205; B60R 22/185
See application file for complete search history.

(56) References Cited

U.S. PATENT DOCUMENTS

| | | | | |
|---|---|---|---|---|
| 4,350,369 | A * | 9/1982 | Chika | B60R 22/14 280/808 |
| 9,783,155 | B2 * | 10/2017 | Kondo | B60R 22/26 |
| 10,814,783 | B1 * | 10/2020 | Mostofizadeh | G07C 5/085 |
| 2008/0054615 | A1 * | 3/2008 | Coultrup | B60R 22/30 280/808 |
| 2018/0304853 | A1 * | 10/2018 | Setina | B60R 22/24 |

* cited by examiner

*Primary Examiner* — Syed A Islam
(74) *Attorney, Agent, or Firm* — Epstein Drangel LLP; Robert L. Epstein

(57) ABSTRACT

A motor vehicle (1) has a driver's seat (8) which is assigned a safety belt (20) for a driver. The safety belt (20) here is held on a pivotable bracket (13). This bracket (13) is pivotable between a releasing position, which permits entry, and a restraining position, which protects the driver. The bracket (13) here is disposed in such a manner that said bracket (13) in the releasing position holds the safety belt (20) in a position in which the latter impedes the driver. In order to avoid any impediment of the driver in the restraining position of the bracket (13), the bracket (13) above the driver's seat is elbowed away from the latter.

14 Claims, 2 Drawing Sheets

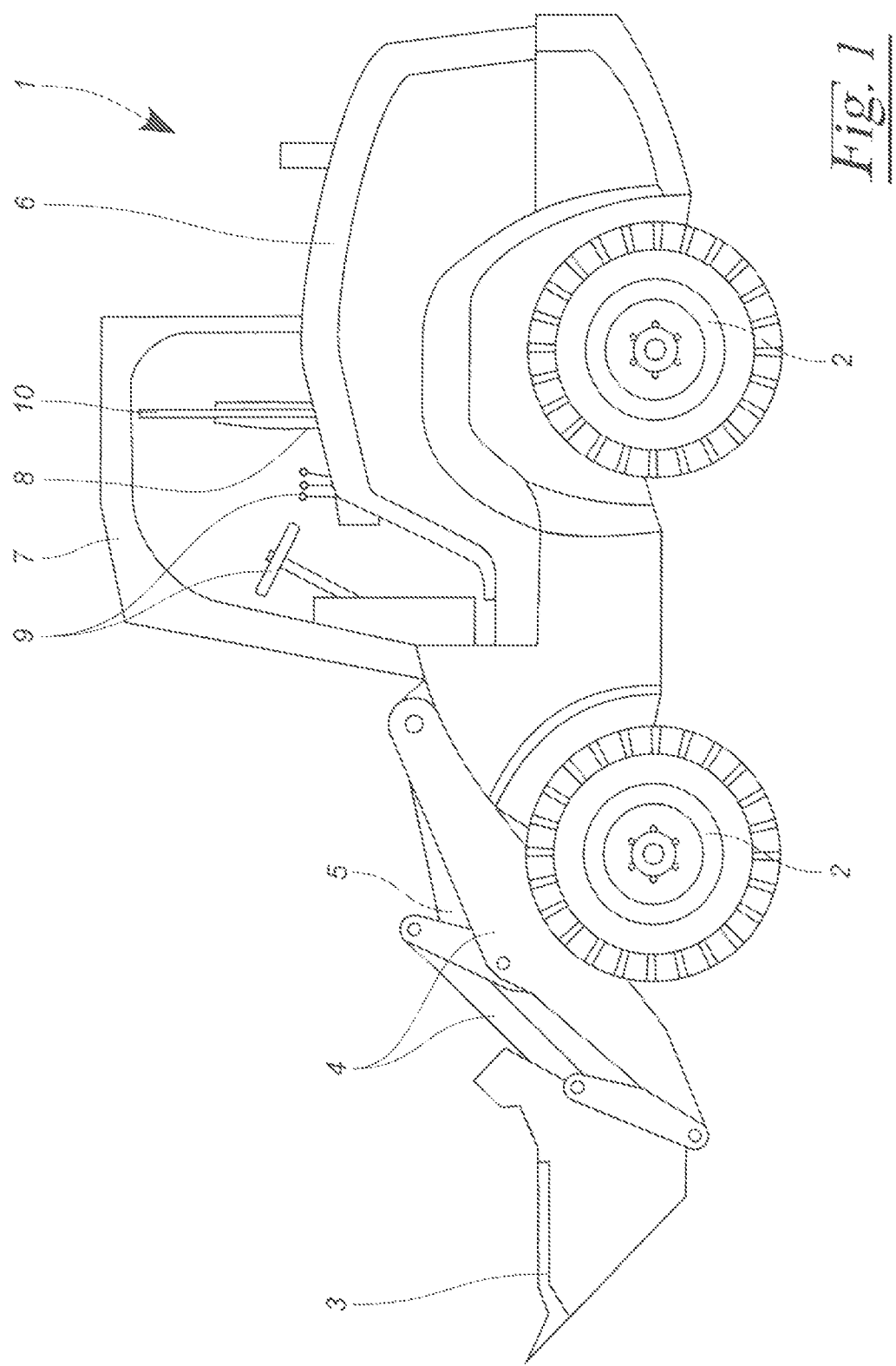

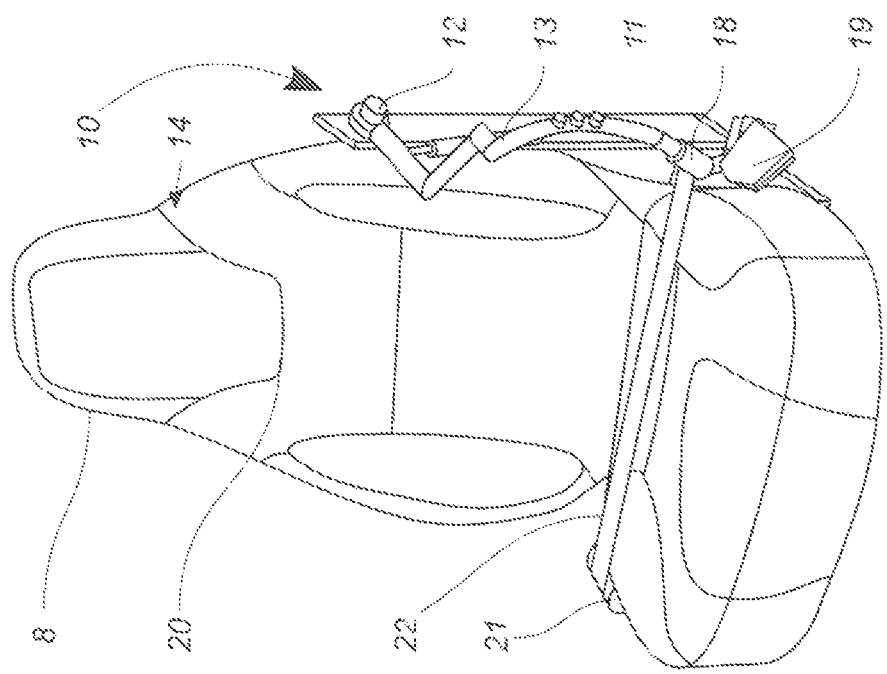
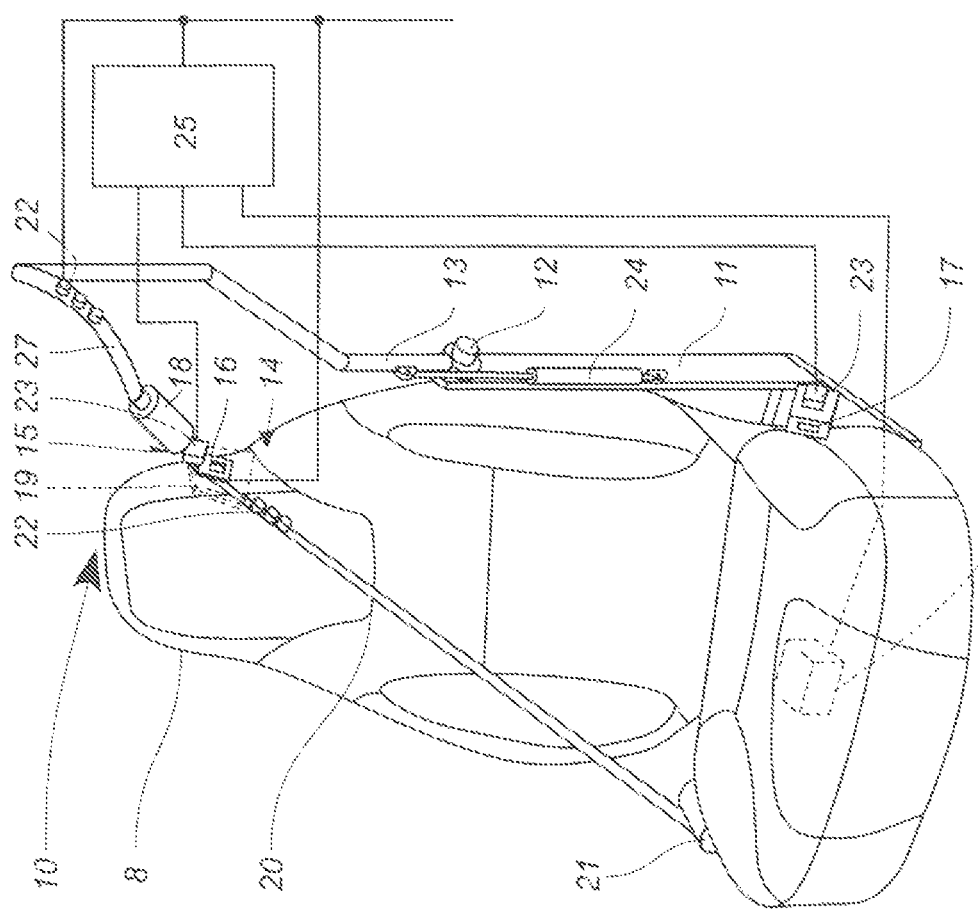

MOTOR VEHICLE HAVING AT LEAST ONE DRIVER'S SEAT

The present application claims priority to German Utility model application no: DE 20 2021 002 772.6, filed Aug. 26, 2021.

FIELD OF THE INVENTION

The invention relates to a motor vehicle having at least one driver's seat for a driver and at least one safety belt. The at least one safety belt is held on a pivotable bracket which is pivotable between a releasing position and a restraining position.

DESCRIPTION OF THE PRIOR ART

Known from EP 1 518 759 A1 is a motor vehicle which has a driver's seat. Provided in order to protect in particular the driver in the event of the motor vehicle capsizing is a safety belt which is held on a bracket that is pivotable about a horizontal axis. The safety belt is fastened by pivoting this bracket to a restraining position, so that said safety belt can perform its desired protective effect. This motor vehicle has proven successful in practical use and forms the point from which the present invention proceeds.

Known from DE 23 43 938 A1 is a motor vehicle of the generic type which has a driver's seat. A safety belt which is held by a bracket is provided for protecting the driver. This bracket is pivotable about a horizontal axis and by way of a lock latch on the end side engages in a belt buckle. This bracket, in a releasing position, holds the belt in an orientation so as to be aligned diagonally in front of the seat so as to enable the belt to be automatically fastened by a motorized drive of the protective bracket.

The invention is based on the object of achieving a motor vehicle of the type mentioned at the outset, which is distinguished by a higher level of acceptance.

This object is achieved by the following features.

BRIEF SUMMERY OF THE INVENTION

A motor vehicle according to the invention is of a fundamentally arbitrary type, wherein however transport trucks such as industrial trucks, excavators, loading shovels and graders are considered in particular. This enumeration is however only by way of example and not to be understood to be exhaustive. The motor vehicle has at least one driver's seat for a driver, said driver's seat being assigned at least one safety belt. This at least one safety belt in the event of an accident has the task of holding the driver on the at least one driver's seat. An accident here is not only to be understood to mean a collision with other vehicles or fixed objects such as walls, but the capsizing of this motor vehicle in particular poses a high risk for the driver. Vehicles for conveying loads are in particular exposed to the risk of undesirable shifting of the centre of gravity being caused by a lack of concentration while operating, tight space conditions or in the terrain, which can consequently lead to the vehicle capsizing. Motor vehicles of this type are typically constructed so as to be sufficiently stable in order for the driver to be adequately protected even in this situation. However, it has been demonstrated that drivers in accident situations as a reflex often attempt to evacuate the vehicle such that the particular protective effect of the vehicle is lost only as a result thereof. As heavy loads are often handled, there is a considerable accident hazard associated with the evacuation of the vehicle by the driver, which can also lead to the death of the driver. For this reason it is important that the driver remains in his driver's seat until the end of the accident event. For this purpose it is known for the driver's seat to be assigned at least one safety belt which holds the driver on the driver's seat. Unfortunately, this additional safety installation is all too often ignored by drivers, because the latter are not aware of the risk associated therewith and the fastening of the seat belt is considered to be only a burden. The accident hazard is in particular severely underestimated because these vehicles typically move at a very slow speed so that the usual hazard sources in highway traffic can indeed be practically precluded, while the particular risks of the transported load, or of the terrain, respectively, are not correctly assessed. In order to achieve a sufficient protective effect, it is therefore of particular importance that the available protective systems, thus in particular the safety belt, are actually utilized. The safety effect of these safety systems therefore depends significantly on the acceptance by the drivers. It has proven successful for the at least one safety belt to be held on at least one pivotable bracket which for fastening the at least one safety belt is pivotable from a releasing position to a restraining position. A potential restraining effect of the at least one bracket here is only a secondary matter. It is important that the at least one safety belt is fastened without any further measures by the driver when the at least one bracket is pivoted. This procedure should ideally be able to be carried out in a simple manner, preferably using a single hand movement. On the other hand, the at least one bracket must not impede the entry and exit of the driver as this would otherwise compromise the acceptance of the safety system. Therefore, the at least one bracket is pivotable from a releasing position, which enables entry and exit, to a restraining position, which holds the driver on the driver's seat. Despite the measures described above, it frequently arises that drivers have perceived the described safety system as annoying and unnecessary and have simply driven in the releasing position of the at least one bracket. This even went so far that installed blocking devices were deactivated in order not to have to fasten the at least one safety belt. However, it is a very positive effect of the at least one bracket that the latter prevents the at least one safety belt from simply remaining in the fastened position and the driver sitting on said safety belt. In this type of operation of the vehicle, the driver would have problems when entering or exiting the vehicle, because the at least one bracket now prevents the driver from doing so. Nevertheless, it has been demonstrated that the acceptance of the safety system must be further improved so as to also avoid potentially fatal accidents. For this purpose, the at least one belt in the releasing position of the at least one bracket is held such that said belt impedes the driver. The type of impediment here is variable in principle. It is in particular conceivable that the driver is impeded in terms of his/her vision and/or in the operation of the vehicle. This enumeration is however only by way of example and is not to be understood to be exhaustive. In principle, this is sufficient in order to dissuade the driver from operating the vehicle in the releasing position of the at least one bracket. In order to provide the driver the necessary freedom of space during the operation of the vehicle, the at least one bracket above the at least one driver's seat is elbowed away from the latter. In this way, the available space in the driver's cab is optimally utilized and the acceptance of the safety system in enhanced.

Motor vehicles are often configured in such a manner that said motor vehicles are cramped in the region of a seating area of the at least one driver's seat, given that many operating elements, for example for controlling the hydraulics, or a joystick controller, are installed therein. The at least one bracket thus has to be assembled so as to be relatively close to the driver's seat in order for the available space to be optimally utilized. However, this leads to an uncomfortable constriction in the shoulder region, which would again reduce the level of acceptance of the safety system. In order for this issue to be avoided it is advantageous for the at least one bracket above the at least one driver's seat to be elbowed away from the latter and/or to be curved outward. In this way, the at least one bracket, when viewed in the horizontal direction, in the lower region close to the seating area of the at least one driver's seat has a smaller spacing from the latter than in the shoulder region. The normal spacing from a vertical central plane through the at least one driver's seat is understood to be the spacing here. In this way, the available space next to the seating area is optimally utilized, and an uncomfortable constriction in the shoulder region is also avoided.

In order to facilitate entry and exit, it is advantageous for the at least one bracket in the releasing position to be held by at least one spring. In this way, the at least one bracket does not first have to be moved to the releasing position before the driver occupies the at least one driver's seat. A gas spring is preferably used as the spring, wherein other spring types such as, for example, helical springs, preferably made from spring steel, can alternatively also be used.

In order to further increase the acceptance of this safety device it is favourable for at least one handle to be provided on the at least one bracket. This at least one handle indicates to the driver where he/she is to grip the at least one bracket in order for the latter to be moved to the restraining position in one move and without changing grip. As a result, complicated handling which could unnecessarily reduce the acceptance of the safety device is avoided from the outset.

In order for the at least one bracket to be securely held in the restraining position it is favourable for at least one lock latch to be provided at the at least one bracket, which in the restraining position engages in at least one buckle fixed to the vehicle. This here can be a customary belt buckle, wherein alternative embodiments are also conceivable. It is considered in particular for retrofitting existing vehicles that the already available belt buckle is utilized for this purpose.

The at least one lock latch can lead to issues associated with injuries because said lock latch in the releasing position lies open in the driver's cab. In order for this issue to be alleviated it is advantageous for at least one, optionally multi-shell, cover to be provided on the at least one lock latch, said cover protecting the at least one lock latch. This at least one cover is pushed away from the at least one buckle so as to release the at least one lock latch in the direct proximity of the restraining position. The at least one cover is preferably composed of leather and/or a comparatively soft polymer so that no risk of injury emanates from either the cover or from the enclosed at least one lock latch. A hardness between 15 Shore A and 100 Shore A is preferable for the polymer.

In order to avoid that the driver operates the motor vehicle in the releasing position of the at least one bracket, the at least one belt in the releasing position can extend diagonally across the at least one driver's seat. In this way, said belt impedes in particular the forward vision of the driver such that the driver will typically move the at least one bracket to the restraining position, which in this instance is perceived to be more comfortable.

Seat belts in motor vehicles are usually dyed black. However, for the present subject matter of the invention it is more expedient for the at least one seat belt to be at least partially dyed red. The fact that the conspicuously red at least one safety belt is visible from the outside only when the at least one bracket is in the releasing position is utilized here. Supervisory personnel or superiors or safety officers can therefore easily check from the outside whether a driver impermissibly operates the vehicle without a fastened seat belt and can take appropriate countermeasures. A black safety belt is significantly more difficult to identify from the outside.

For further improving the ability of checking the at least one safety belt from the outside it is advantageous for the at least one safety belt and/or the at least one bracket to be provided with at least one illumination means. In this way, it is also possible for the utilization of the safety systems by the driver to be checked in a simple manner in particular also in poor light conditions during dusk. The illumination means is preferably configured in a flashing manner so as to further improved the recognizability and to further irritate the driver in the case of an incorrectly fastened at least one safety belt.

The at least one illumination means is preferably actuated in such a manner that the latter is extinguished in the restraining position. Corresponding controlling can be implemented by a switch in the region of the at least one buckle and/or the at least one lock latch, for example. Checking the position of the restraining installation is thus possible, which in this instance can advantageously be used for actuating the at least one illumination means.

It is favourable for the at least one bracket to be configured so as to be operatively connected in a controlling manner to the vehicle such that this results in an immobilizer and/or an acoustic and/or optical signal is generated when the at least one bracket is not in the restraining position. In this way, the driver first has to manipulate the immobilizer in order to deactivate the safety device, this as a result of the additional disadvantages to the driver mentioned above however not being perceived to be expedient. It can thus be assumed that the immobilizer will not be deactivated, and any inadvertent lack of use of the safety installation thus also remaining reliably precluded. The acoustic and/or optical signal serves as a warning to the driver.

Moreover, it is advantageous for at least one seat contact switch to be provided on the at least one driver's seat. Said seat contact switch registers when the driver has occupied the at least one driver's seat, and compares this point in time with that of the transfer of the at least one bracket to the restraining position. The controller responds to this sequence in such a manner that the immobilizer, the optical signal and/or the acoustic signal remain active when the at least one seat contact switch has been activated after the at least one bracket has been transferred to the restraining position. It is to be avoided in this way that the at least one bracket remains in the restraining position while the driver sits on top of the safety belt. Any inadmissible circumvention of this safety installation is thus avoided.

BRIEF DESCRIPTION OF THE DRAWINGS

Other advantages and characteristics of this invention will be explained in the detailed description below with reference to the associated figures that contain several embodiments of this invention. It should however be understood, that the figure is just used to illustrate the invention and does not limit the scope of protection of the invention.

Wherein:

FIG. 1 shows a lateral view of a motor vehicle;

FIG. 2 shows a spatial illustration of a driver's seat having a restraining system in the releasing position; and FIG. 3 shows the assembly according to FIG. 2 in the restraining position.

DETAILED DESCRIPTION OF THE INVENTION

FIG. 1 shows a lateral view of a motor vehicle, in particular of a loading shovel. This motor vehicle 1 has wheels 2 which for improved off-road ability can alternatively also be replaced by tracks. The motor vehicle 1 moreover has a loading installation 3 which serves for transporting a load not illustrated. In the exemplary embodiment according to FIG. 1, this loading installation 3 is configured as a shovel. The loading installation 3 by way of lever arms 4 is adjustable by means of hydraulic cylinders 5.

The motor vehicle 1 moreover on the rear has a cowl 6 under which an internal combustion engine for driving the wheels 2 and the hydraulic cylinders 5 is provided. The motor vehicle 1, between the lever arms 4 and the cowl 6, has a driver's cab 7 in which a driver's seat 8 is provided. Situated in this driver's cab 7 are moreover all operating elements 9 by way of which the motor vehicle 1 and all the functions thereof can be controlled. A restraining system 10 holds the driver on the driver's seat 8, in particular in the event of an accident.

The further details, in particular the restraining system 10, will be explained by means of the detailed illustrations according to FIGS. 2 and 3. These figures show the driver's seat 8 conjointly with a restraining system 10, wherein all other parts of the motor vehicle 1 have been omitted. A holding panel 11 on which a bracket 13 is pivotably held by way of a rotary joint 12 is fastened to the driver's seat 8. The bracket 13 in the releasing position illustrated in FIG. 2 protrudes upward so as to enable unimpeded entry and exit by the driver.

The bracket 13 is elbowed in such a manner that said bracket 13 in a shoulder region of the driver is bent away from the latter. This results in improved shoulder room, in particular in the restraining position illustrated in FIG. 3. A curved portion 27, which in the releasing position according to FIG. 2 is substantially directed horizontally toward the front, adjoins this elbowed region. The curvature of this curved region 27 here is directed away from the driver's seat 8 so as to guarantee more freedom of space for the driver in the restraining position according to FIG. 3.

The bracket 13 in a free end region 15 has a lock latch 16 which in the restraining position according to FIG. 3 interacts with a buckle 17 next to the driver's seat 8. The bracket 13 by means of the lock latch 16 here is locked in the buckle 17 such that any self-acting adjustment of the bracket 13 to the releasing position according to FIG. 2 is precluded. To this end, a corresponding end lock on the buckle 17 has to be activated.

The bracket in the free end region 15 moreover has a handle 18 by which the bracket 13 can be gripped by the driver so as to move said bracket 13 to the restraining position according to FIG. 3 by way of a simple pivoting movement. This handle is not only intended to offer an ergonomic function for better gripping the bracket 13 but moreover ensures that the driver immediately knows at which point he/she has to engage on the bracket 13 in order to be able to pivot the latter.

In order to preclude any risk of injury by the lock latch 16, the latter is surrounded by a multi-shell cover 19. When the bracket 13 is pivoted to the restraining position, this cover 19 is pushed apart by the buckle 17 so that the lock latch 16 can penetrate the buckle 17.

Moreover, a safety belt 20 which is wound up in a roll 21 is fastened to the bracket 13. This safety belt 20 in the releasing position illustrated in FIG. 2 runs diagonally across the driver's seat 8 such that said safety belt 20 impedes the vision as well as the operation of the motor vehicle 1 by the driver. This ensures an improved acceptance of the restraining system 10 such that the driver at all times operates the motor vehicle 1 in the restraining position illustrated in FIG. 3.

In order to be able to observe the correct use of the restraining system 10 also from the outside, the safety belt 20 is dyed red and moreover has illumination means 22, preferably in the form of light emitting diodes. Corresponding illumination means 22 are moreover provided on the bracket 13. Limit switches 23 in the region of the lock latch 16 and/or of the buckle 17 activate the illumination means 22 preferably in a flashing mode, should the buckle 13 not be in the restraining position illustrated in FIG. 3. It becomes evident in this way that the motor vehicle 1 is not being utilized in an orderly manner.

A spring 24 which is configured as a gas spring is moreover provided in the region of the rotary joint 12. This spring 24 ensures that the bracket 13 is pre-tensioned to the releasing position illustrated in FIG. 2, so as to guarantee simple entering and exiting.

The limit switches 23 are connected to a motor control unit not illustrated in such a manner that this results in an immobilizer when the restraining system 10 is not in the restraining position illustrated in FIG. 3.

The driver's seat 8 is moreover assigned a seat contact switch 26 which is triggered when the driver occupies the driver's seat 8. This seat contact switch 26 is connected to the controller 25, wherein the controller 25 detects the activation sequence between the seat contact switch 26, on the one hand, and the limit switch 23, on the other hand. The immobilizer implemented by the controller 25 here is only deactivated when the seat contact switch 26 has been activated before the limit switch 23. It is avoided in this way that the driver occupies the driver's seat 8 when the bracket 13 is already in the restraining position illustrated in FIG. 3. In this case, the driver would be sitting on top of the safety belt 22 such that the safety belt 22 could not impart any kind of protective effect.

LIST OF REFERENCE NUMERALS

1 Motor vehicle
2 Wheel
3 Loading installation
4 Lever arm
5 Hydraulic cylinder
6 Cowl
7 Driver's cab
8 Driver's seat
9 Operating element
10 Restraining system
11 Holding panel
12 Rotary joint
13 Bracket
14 Shoulder region
15 Free end region
16 Lock latch 17 Buckle
18 Handle
19 Cover
20 Safety belt
21 Roll
22 Illumination means
23 Limit switch
24 Spring
25 Controller
26 Seat contact switch
27 Curved portion

The invention claimed is:

1. Motor vehicle having at least one driver's seat for a driver and at least one safety belt which in the event of an accident holds said driver on said driver's seat, wherein said at least one safety belt is held on at least one pivotable bracket which for fastening said at least one safety belt is pivotable from a releasing position, which permits entry, to a restraining position, which protects said driver, and said at least one bracket in said releasing position holds said at least one safety belt diagonally across said at least one seat, hereby impeding said driver, wherein said at least one pivotable bracket above said at least one driver's seat is elbowed away from said at least one driver's seat.

2. Motor vehicle according to claim 1, wherein said at least one bracket in said restraining position above said at least one driver's seat is curved outward.

3. Motor vehicle according to claim 1, wherein said at least one bracket in said releasing position is held by at least one spring.

4. Motor vehicle according to claim 1, wherein said the at least one bracket has at least one handle.

5. Motor vehicle according to claim 1, wherein said at least one bracket has at least one lock latch which in said restraining position engages in at least one buckle fixed to said vehicle.

6. Motor vehicle according to claim 5, wherein said at least one lock latch is protected by at least one multi-shell cover which is able to be pushed away from the at least one buckle.

7. Motor vehicle according to claim 1, wherein said at least one safety belt in said releasing position can extend diagonally across said at least one driver's seat.

8. Motor vehicle according to claim 1, wherein said at least one safety belt is at least partially dyed red.

9. Motor vehicle according to claim 1, wherein said at least one safety belt is provided with at least one illumination means.

10. Motor vehicle according to claim 9, wherein said at least one illumination means in said restraining position is switched off.

11. Motor vehicle according to claim 1, wherein said at least one bracket is provided with at least one illumination means.

12. Motor vehicle according to claim 11, wherein said at least one illumination means in said restraining position is switched off.

13. Motor vehicle according to claim 1, wherein a controller is provided which, when said at least one bracket is not in said restraining position, at least one of preventing travel of the vehicle, emitting an acoustic signal and emitting an optical signal is provided.

14. Motor vehicle according to claim 13, wherein at least one seat contact switch which is operatively connected to said controller is provided on said at least one driver's seat, said controller querying an activation sequence between the triggering of said at least one seat contact switch and the moving of said at least one bracket to said restraining position.

* * * * *